Patented May 2, 1939

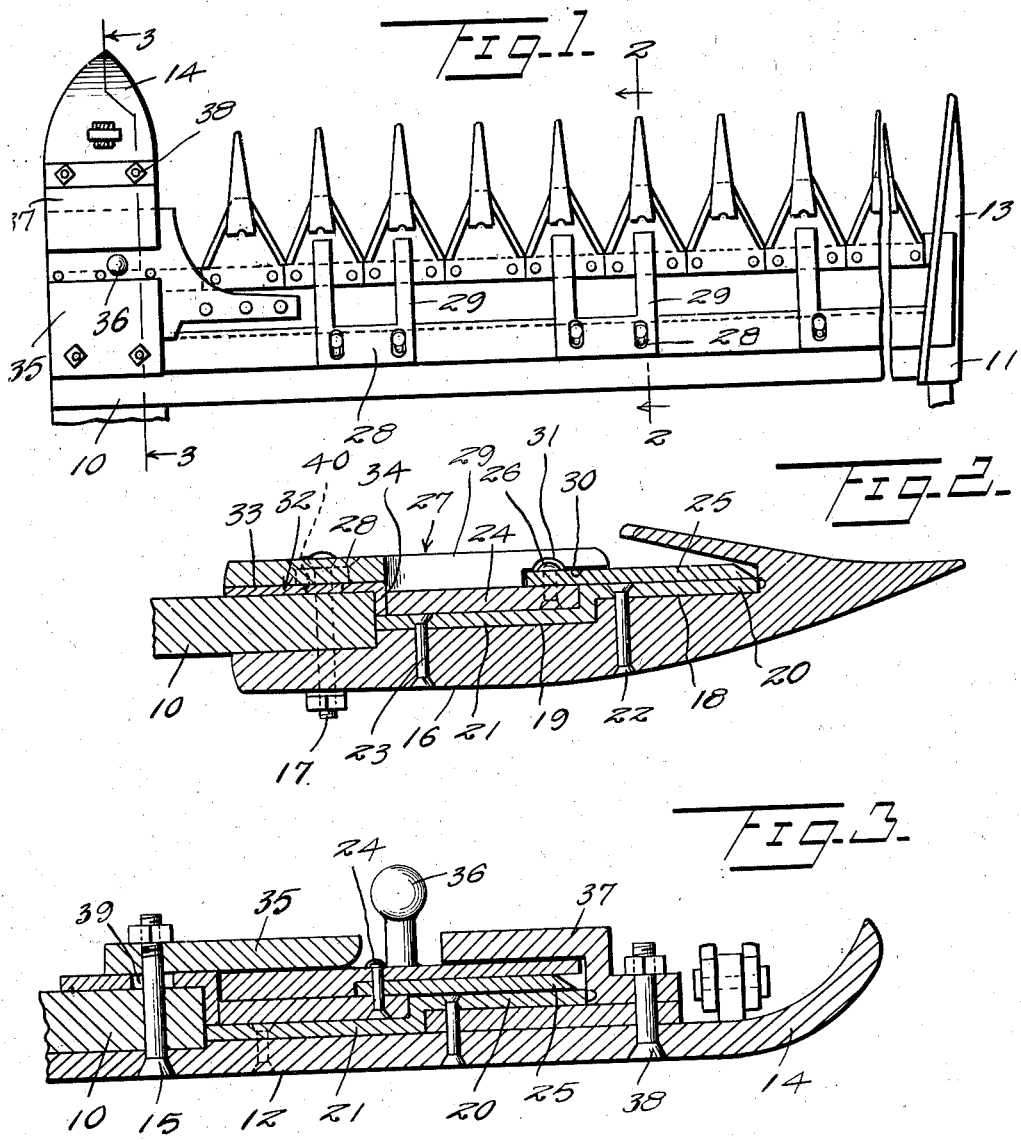

2,156,745

UNITED STATES PATENT OFFICE 2,156,745

SICKLE BAR ASSEMBLY

Vereau L. Stathem, Riverdale, Calif.

Application May 15, 1937, Serial No. 142,906

1 Claim. (Cl. 56—305)

This invention relates to mower constructions and more particularly to an improved sickle bar assembly which is so constructed that the sickle may be used for a greater length of time without sharpening the teeth thereon and may be used for different kinds of grain without requiring adjustment of the movable cutting means, as is necessary with sickle assemblies at present in use.

Another object of this invention is to provide in a sickle bar assembly, means for taking up the wear between the stationary cutter bar and the movable or reciprocating cutter bar so that the device can be used for a greater length of time without replacement of the various parts and, at the same time, provide an assembly wherein the gradual wearing down of the various parts will not adversely effect the operation of the sickle.

A further object of this invention is to provide an improved means for yieldably holding the movable cutter bar in contact with the teeth of the stationary bar and to provide additional wearing surfaces for the movable cutter bar so as to reduce the wear on the movable and stationary bars and thus eliminate the necessity of continually adjusting or replacing the wearing parts.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a top plan partly broken away of a sickle bar assembly constructed according to an embodiment of this invention.

Figure 2 is an enlarged sectional view taken on the line 2—2 of Figure 1.

Figure 3 is an enlarged sectional view taken on the line 3—3 of Figure 1.

Referring to the drawing, the numeral 10 designates generally a stationary frame bar or finger bar which is adapted to be secured at its inner end to a mower construction of conventional type. The bar 10 at its outer end is provided with a shoe 11 having a runner 13 secured to the underside thereof. The bar 10 at its inner end has secured thereto a guard member 12, which is provided with an upturned tapered forward end 14. This guard 12 is secured to the underside of the supporting bar 10 as by bolts 15 or the like.

A plurality of guard members 16 are secured to the finger bar 10 as by bolts 17 and these guard members 16 are provided with a blade supporting shoulder 18 and a second shoulder 19 which is stepped downwardly from the shoulder 18 upon which a stationary cutting blade 20, provided with a shank 21, is adapted to engage. The blade 20 rests on the shoulder 18 and is secured thereto as by a rivet 22 or like fastening means and the shank 21 is secured to the shoulder 19 as by a rivet 23 or like fastening device.

The upper surface of the shank 21 provides a bearing surface for a slide bar 24, which extends longitudinally of the finger bar 10 and the upper surface of the slide bar 24 is preferably substantially flush with the upper surface of the stationary cutting blade 20.

The slide bar 24 has secured thereto a plurality of cutting blades 25 which are fastened to the forward edge of the slide bar 24, as by rivets 26 or like fastening means, so that the movable cutting blades 25 may be replaced by removing the rivets or fastening members 26 where necessary. The undersides of the cutting blades 25 slide over the top surfaces of the stationary blades 20 and the blades 25 are frictionally held in contact with the blades 20 by means of a plurality of U-shaped wear plates 27. The wear plates 27 comprise a base or bight portion 28, provided with suitable holes through which the bolts 17 are adapted to pass and the bight 27 is firmly held on the finger bar 10 by the bolts 17. The forwardly projecting parallel arms 29 which are integral with the bight 28 project forwardly over the upper surface of the slide bar 24 and are provided at their forward end portions with rabbeted under faces 30 which overlie the inner ends of the blades 25.

The arms 29 are also provided with alined grooves 31 in which the heads of the rivets or fastening members 26 are received. That portion of each arm 29 inwardly of the rabbeted portion 30 and outwardly of the bight 28, is adapted to contact with the upper surface of the slide bar 24 so as to firmly hold this slide bar 24 and the blades 25 against the shanks 21 and the blades 20, respectively.

A wear plate or member 32 is interposed between the bight 28 of the pressure member 27 and this wear plate 32 is preferably substantially L-shaped in transverse section with one leg 33 thereof resting on the upper surface of the finger bar 10 and the other leg 34 projecting downwardly over the forward edge of the finger bar 10 and between the forward edge of the finger bar 10 and the rear edge of the slide bar 24.

In this manner, the rear edge of the slide bar 24 will wear against the removable wear plate 32 rather than against the forward edge of the finger bar 10 and will also wear against the shanks 21, forming an integral part of the blades 20. The pressure members 27 are adapted to firmly hold the blades 25 in contact with the blades 20 and also hold the slide bar 24 in contact with the upper surfaces of the shanks 21.

A holding plate 35 is secured to the finger bar 10 adjacent the inner end thereof by means of the bolts 15. This holding plate 35 overlies the inner end portion of the slide member 24 and preferably this member 24 is enlarged at the inner end thereof so as to provide a relatively large wear surface at its inner end. An upwardly projecting post 36 is carried by the slide bar 24 adjacent the inner end thereof and provides a means for connection between the slide bar 24 and the operating means therefor (not shown) which is conventional in mower mechanisms.

A second holding member 37 is secured to the guard member 12 by means of bolts 38 or the like and preferably this holding member 37 has an upwardly offset portion between the inner end of which and the forward end of the clamping bar 35, the coupling member 36 is adapted to engage.

In the use of this sickle bar assembly, the stationary or lower blades 20 are secured by means of the rivets 22 and 23 to the guard members 16 and the downwardly offset shank 21 acts as a wear surface for the slide 24. The wear plate or shim 32 is provided with elongated holes 39 through which the bolts 15 and 17 pass so that the wear plates 32 may, upon wearing of the forward edge 34 thereof, be moved forwardly by loosening the bolts 15 and 17. The wear member 32 will have the forward flange or leg 34 thereof interposed between the rear edge of the slide bar 24 and the forward edge of the finger bar 10 so that the contact of the slide bar at its rear edge will be against a wear plate which is easily adjustable in the event there is too much play between the slide bar 24 and the channel formed by the downwardly offset shank 21 and the forward edge of the finger bar. This wear member 32 may readily be adjusted or replaced, thus making it unnecessary to provide new finger bars and other parts upon wearing as is the case in present mower constructions. The pressure members 27 may also be provided with elongated holes or slots 40 so that these members may also be adjusted to take up wear.

The bolts 17 may be tightened to the desired degree so as to apply the necessary pressure on the pressure arms 29 and thus hold the slide bar 24 and the blades 25 in sliding engagement with the shanks 21 and the blades respectively. The shim or wear member 32 will have the forward flange or leg 34 thereof interposed between the rear edge of the slide bar 24 and the forward edge of the finger bar 10 so that the contact of the slide bar at its rear edge will be against a wear plate which is easily removable so that in the event there is too much play between the slide bar 24 and the channel formed by the downwardly offset shank 21 and the forward edge of the finger bar 10, a new wear plate or shim may be used, thus making it unnecessary to replace both the slide bar and the finger bar as is necessary in present constructions.

It is, of course, understood that various changes and modifications may be made in the details of construction and design of the above specifically described embodiment of this invention without departing from the spirit thereof, such changes and modifications being restricted only by the scope of the following claim.

I claim:

A sickle bar assembly comprising a supporting bar, a plurality of guard fingers, the rear ends of which abut against the under surface of the supporting bar, said guard fingers having stepped upper faces, stationary blades disposed on the stepped upper faces of the guard fingers and provided with downwardly offset shank members, a slide bar mounted in the channel formed by said shank members and the forward edge of said supporting bar but spaced from the latter, blades carried by said slide bar, a plurality of longitudinally spaced U-shaped pressure members secured to the supporting bar and the parallel arms thereof projecting forwardly over the slide bar to hold the latter in contact with the stationary blades and the shank members thereof, a wear member substantially L-shaped in cross section interposed between the pressure members and the supporting bar and extending downward into the space between the supporting bar and the slide bar, and bolts extending thru the guard fingers, the supporting bar, the pressure members and the said interposed wear member to hold said parts securely together, the wear member being formed with slots whereby it may be adjusted to take up the wear on the slide bar.

VEREAU L. STATHEM.